United States Patent [19]

Kiemer et al.

[11] 4,220,063
[45] Sep. 2, 1980

[54] GUILLOTINE ASSEMBLY

[75] Inventors: Ralph F. Kiemer; Robert C. Baugher, both of Akron, Ohio

[73] Assignee: The Steelastic Company, Akron, Ohio

[21] Appl. No.: 936,564

[22] Filed: Aug. 24, 1978

[51] Int. Cl.² ............................................. B26D 1/08
[52] U.S. Cl. ........................................ 83/635; 83/640; 83/641; 83/639; 83/636; 83/700; 83/694
[58] Field of Search ................. 83/700, 636, 694, 639, 83/640, 635, 641

[56] References Cited

U.S. PATENT DOCUMENTS

| | | | |
|---|---|---|---|
| 1,866,855 | 7/1932 | Kirsten | 83/700 |
| 2,339,641 | 1/1944 | Jensen | 83/700 |
| 2,539,602 | 1/1951 | Wehr | 83/700 |
| 2,734,572 | 2/1956 | Pater | 83/700 |
| 3,122,048 | 2/1964 | Warner | 83/700 |
| 3,623,388 | 11/1971 | Göttling et al. | 83/636 |

Primary Examiner—Donald R. Schran
Attorney, Agent, or Firm—Hamilton, Renner & Kenner

[57] ABSTRACT

A guillotine assembly (20) having opposed cutting blades (65,85), the orientation of which can be adjustably preselected to provide both vertical and horizontal relative inclination in order to provide initial and progressive interference between the blades (65,85) as they effect a progressive cut therebetween. At least one blade (65) is mounted to allow a progressive movement with respect to the mechanism on which it is supported in order to accommodate the preselected degree of progressive interference between the blades.

10 Claims, 13 Drawing Figures

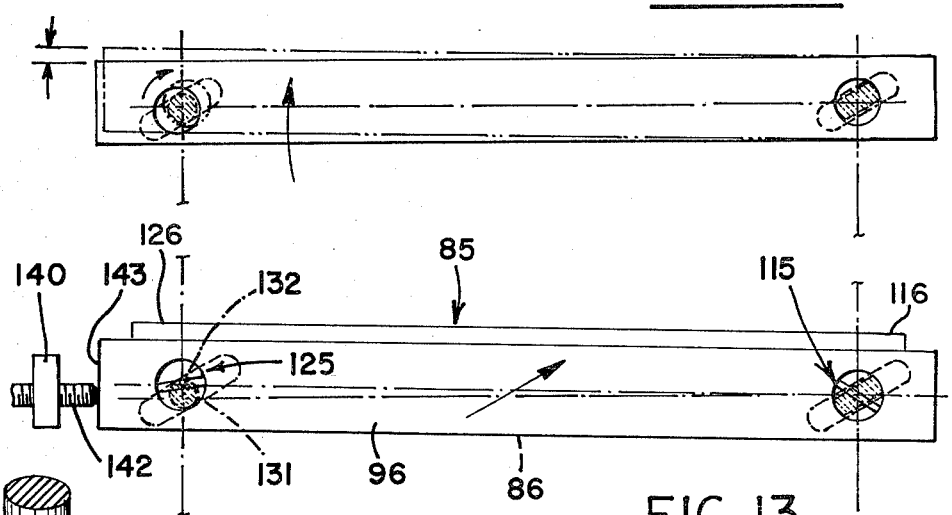
FIG. 12
FIG. 13
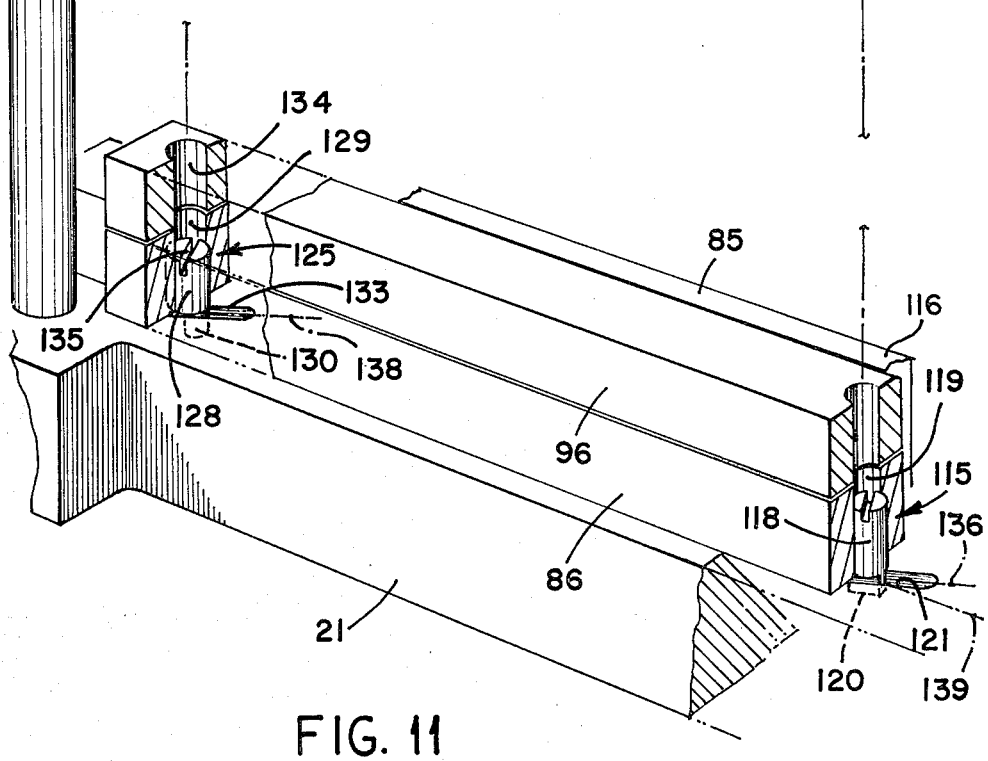
FIG. 11

GUILLOTINE ASSEMBLY

TECHNICAL FIELD

The present invention relates generally to a guillotine assembly adapted to cut reinforced elastomeric fabric of the type which may be ultimately incorporated in a variety of goods including power drive belts, reinforced hosing, containers such as fuel cells and, most assuredly, tires. More particularly, the present invention relates to a guillotine mechanism in which the disposition of the upper and lower blades can be accurately adjusted to provide the desired initial and progressive interference between the cutting edges thereon and in which a limited, progressive lateral movement of one blade with respect to the other can be predetermined effectively to translate the aforesaid blade interference into an efficient cutting shear. Specifically, the present invention relates to a guillotine assembly wherein the blade action cleanly severs even those elastomeric fabrics reinforced with metallic strands.

BACKGROUND ART

Guillotine assemblies of the type to which the present invention generally relate have particular application in conjunction with the type apparatus epitomized by the disclosure in U.S. Pat. No. 4,087,308. In the type apparatus disclosed in the aforesaid patent a guillotine assembly is preferably employed to sever incremental strips from the ribbon of reinforced elastomeric fabric as soon as the latter is deposited on the assembly portion of the apparatus.

In such prior art guillotine assemblies the blades are fixedly secured to their respective holders, and while such an arrangement is satisfactory, it has been found that increased cutting power, longer blade life and cleaner cuts can be achieved by virtue of the hereinafter described guillotine assembly.

DISCLOSURE OF INVENTION

It is, therefore, an object of the present invention to provide an improved guillotine assembly for cleanly severing reinforcing strips of elastomeric material.

It is a further object of the present invention to provide a guillotine assembly, as above, wherein the relative disposition of the opposed cutting blades can be accurately and adjustably preselected.

It is an even further object of the present invention to provide a guillotine assembly, as above, in which a preselected interference between the cutting blades can be employed.

It is yet another object of the present invention to provide a guillotine assembly, as above, wherein means are provided to achieve a limited, progressive lateral movement between the blades in order to translate blade interference into an effective cutting shear.

These and other objects, together with the advantages thereof over existing and prior art forms which will become apparent from the following specification, are accomplished by means hereinafter described and claimed.

In general, a guillotone assembly embodying the concept of the present invention has a basal platform. Means are provided to secure an anvil, cutting blade to the basal platform.

A pair of parallel, laterally spaced pillars are secured to, and extend outwardly from the basal platform. At least one bearing is slidably received on each pillar, and a beam is suspended between those bearings. A second, or upper, cutting blade is secured to the beam.

Means are provided accurately to adjust the extent of interference between cutting blades, and means are further provided to accommodate a limited, progressive lateral movement of one cutting blade with respect to the other during the cutting movement thereof in order to translate the interference into an effective cutting shear.

One preferred embodiment of the guillotine assembly incorporating the concepts of the present invention is shown by way of example in the accompanying drawings and is described in detail without attempting to show all of the various forms and modifications in which the invention might be embodied; the invention being measured by the appended claims and not by the details of the specification.

BRIEF DESCRIPTION OF THE DRAWINGS

FIG. 11 is a perspective, partly broken, depicting the interconnection between the anvil blade carrier and the basal platform by which the disposition of the anvil blade is adjusted to effect desired interference with the upper blade;

FIG. 12 is a schematic representation depicting how the angular orientation of the anvil blade is adjusted by virtue of the arrangement depicted in FIG. 11 to achieve progressive interference between the blades; and, FIG. 13 is a schematic representation similar to that of FIG. 12 and depicting how the lateral position of the anvil blade is adjusted by virtue of the arrangement depicted in FIG. 11 to achieve the desired initial interference.

PREFERRED EMBODIMENT FOR CARRYING OUT THE INVENTION

A guillotine assembly embodying the concept of the present invention is designated generally by the numeral 20 on the attached drawings. The guillotine assembly 20 has a basal platform 21 by which it can be attached to the apparatus with which it is to be used and from which the remainder of the guillotine assembly 20 is supported.

Figure 2:
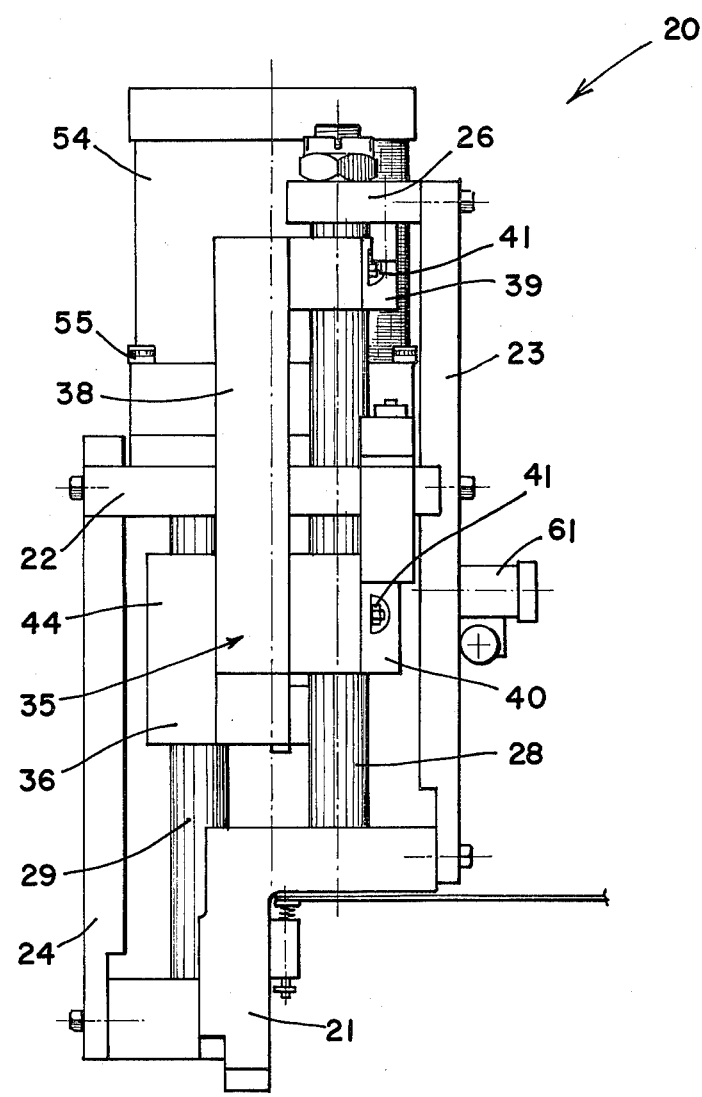
FIG. 2 is a side elevation of the guillotine assembly taken substantially along line 2—2 of FIG. 1.
Figure 3:
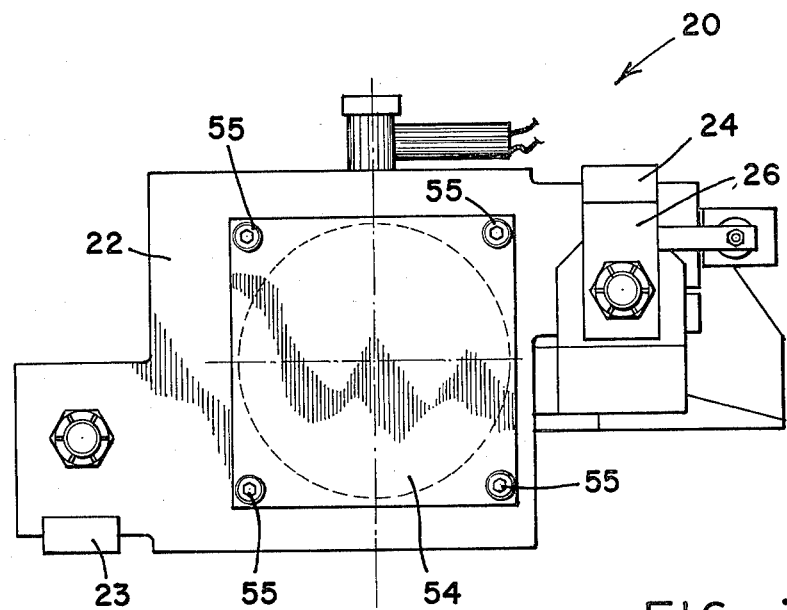
FIG. 3 is a top plan of the guillotine assembly depicted in the previous figures.

A drive cylinder mounting plate 22 is disposed in vertically spaced relation above the basal platform 21 by a pair of support bars 23 and 24 each of which is secured to the basal platform 21 and the mounting plate 22 by a plurality of machine screws 25. The upper terminus of support bar 23 is located at approximately the level of the mounting plate 22, but support bar 24 extends upwardly with respect to the mounting plate 22 and is rigidly secured to a collar plate 26 (FIGS. 2 and 3) that extends radially outwardly therefrom.

Figure 8:
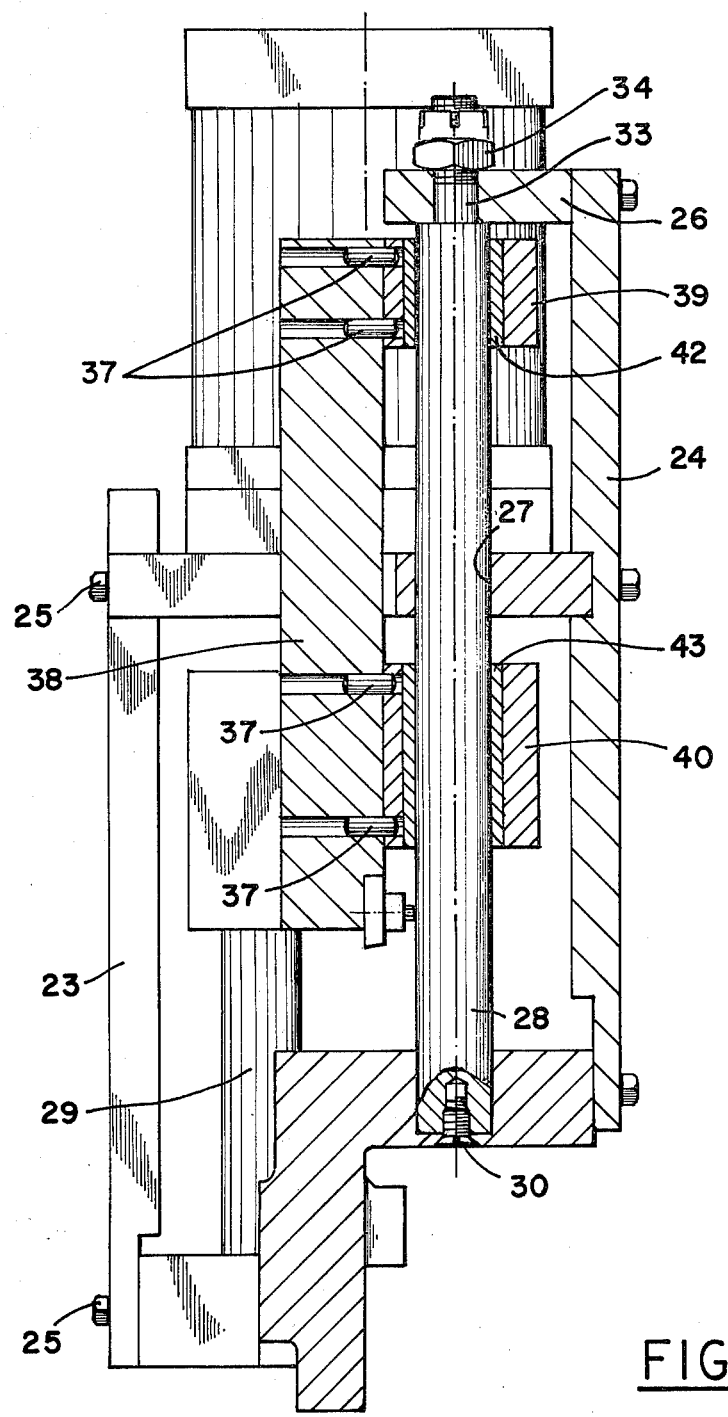
FIG. 8 is an enlarged vertical section taken substantially along line 8—8 of FIG. 1 and depicting the bearing assemblies by which the guillotine is slidably supported on the second pillar.

A pair of parallel, cylindrical pillars 28 and 29 are anchored within the basal platform 21, as by locking screws 30 (FIG. 8) which retain the foot of each pillar within appropriate bores in the basal platform. Pillar 29 may be similarly connected to the basal platform 21.

Figure 5:
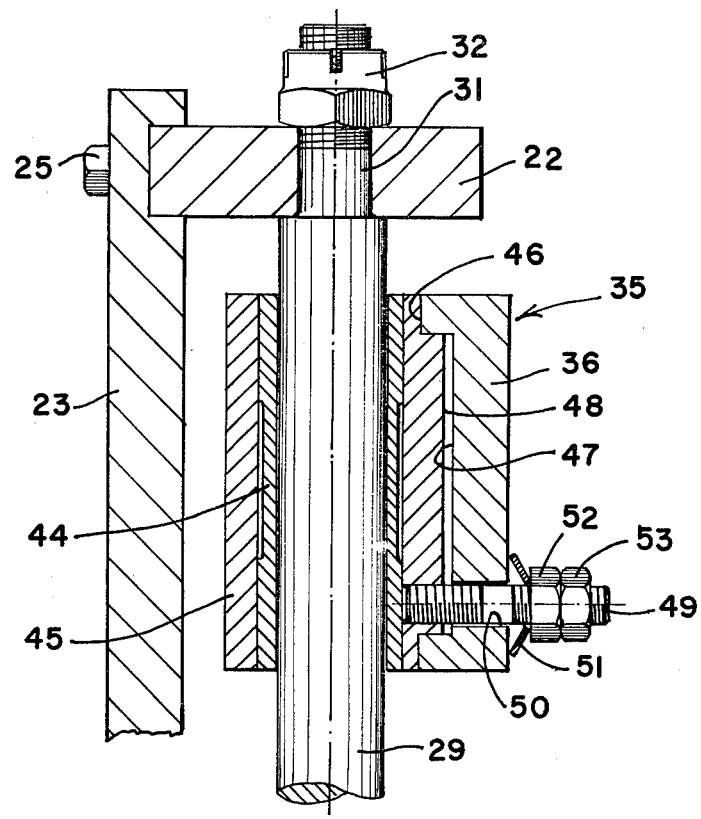
FIG. 5 is an enlarged vertical section taken substantially along line 5—5 of FIG. 1 to show the floating bearing assembly by which the guillotine beam is slidably supported on one of the pillars presented from the basal platform.

The upper extremity of pillar 29 is necked down, as at 31, to be received through an appropriate bore 27 (FIG. 8) in the mounting plate 22 (FIG. 5), and the connection is secured by a lock nut 32 received on the necked down portion 31. Pillar 28 extends upwardly through the mounting plate 22 and similarly terminates in a necked down portion 33 (FIG. 8) received through an appropriate bore in the collar plate 26 where it is secured by a lock nut 34. In order to effect a connection between the pillar 29 and the mounting plate 22 the bore 27 may be discontinuous to provide a split clamping action.

A beam 35 is slidably mounted on the laterally spaced pillars 28 and 29. The beam 35 is of generally L-shaped configuration, one leg of which comprises a span portion 36 and the other leg of which comprises a stabilizing portion 38. A pair of bearing blocks 39 and 40 (FIGS. 2 and 8) are secured to the stabilizing portion 38, as by machine screws 41, with one block 39 disposed upwardly of the mounting plate 22 and the other block 40 disposed between the basal platform 21 and the mounting plate 22. Each block 39 and 40 houses a sleeve bearing 42 and 43, respectively, that is slidable, and to at least some extent, rotatable along and about pillar 28 for a purpose more fully hereinafter described. Extremely accurate disposition of the blocks 39 and 40 with respect to the beam 35 may be assured by virtue of aligning pins 37.

A similar sleeve bearing 44 (FIGS. 2 and 5) is slidably received on pillar 29. The sleeve bearing 44 is housed in a bearing block 45 that is floatingly secured to that end of the span portion 36 most remote from the stabilizing portion 38. That is, span portion 36 has a dado ledge 46 on which the bearing block 45 is slidably received. The face of the dado ledge 46 is recessed, as at 47, to receive a raised locating pad 48 presented from the bearing block 45.

A stud bolt 49 is secured to the locating pad 48 and extends outwardly through an oversized bore 50 opening through the span portion 36 of the beam 35 from the base of the recess 47. Exteriorly of the beam 35 a compression washer 51 may be adjustably tightened against the beam, as by nut 52 which, when adjusted to the desired degree, is locked, as by a second nut 53.

The compression washer 51 allows a predetermined degree of separation between the beam 35 and the bearing block 45. The vertical dimension of the pad 48 is substantially equal to the vertical dimension of the recess 47 in order to maintain a fixed vertical relationship between the beam 35 and the bearing block 45, even as they move transversely toward and away from each other against the action of the compression washer 51, the purpose for which will be more fully hereinafter described in conjunction with an explanation of the cutting action achieved by the improved guillotine assembly 20.

With respect to the horizontal dimension of the recess 47, it should be in excess of the corresponding dimension of the pad 48 in order to obviate any binding between the beam 35 and the bearing block 45 as they move relative to each other as permitted by the compression washer 51. The relative oversize of the bore 50 with respect to the size of the stud bolt 49 is also selected to obviate any binding resistance with respect to the permitted relative movement between the beam 35 and the bearing block 45.

It should be appreciated that with the pillars 28 and 29 fixedly positioned, the bearing slidably received on one will remain a fixed distance away from those on the other. Moreover, the blocks 39 and 40 are rigidly secured to the beam 35. Thus, the rotative movement of the beam 35 about the axis of pillar 28 as the beam 35 moves relative to the block 45 requires an accommodation in the projected dimension of the span between the axis of pillar 28 and the connection between the beam 35 in the block 45. The floating mount hereinbefore described effects this required accommodation.

Figure 1:
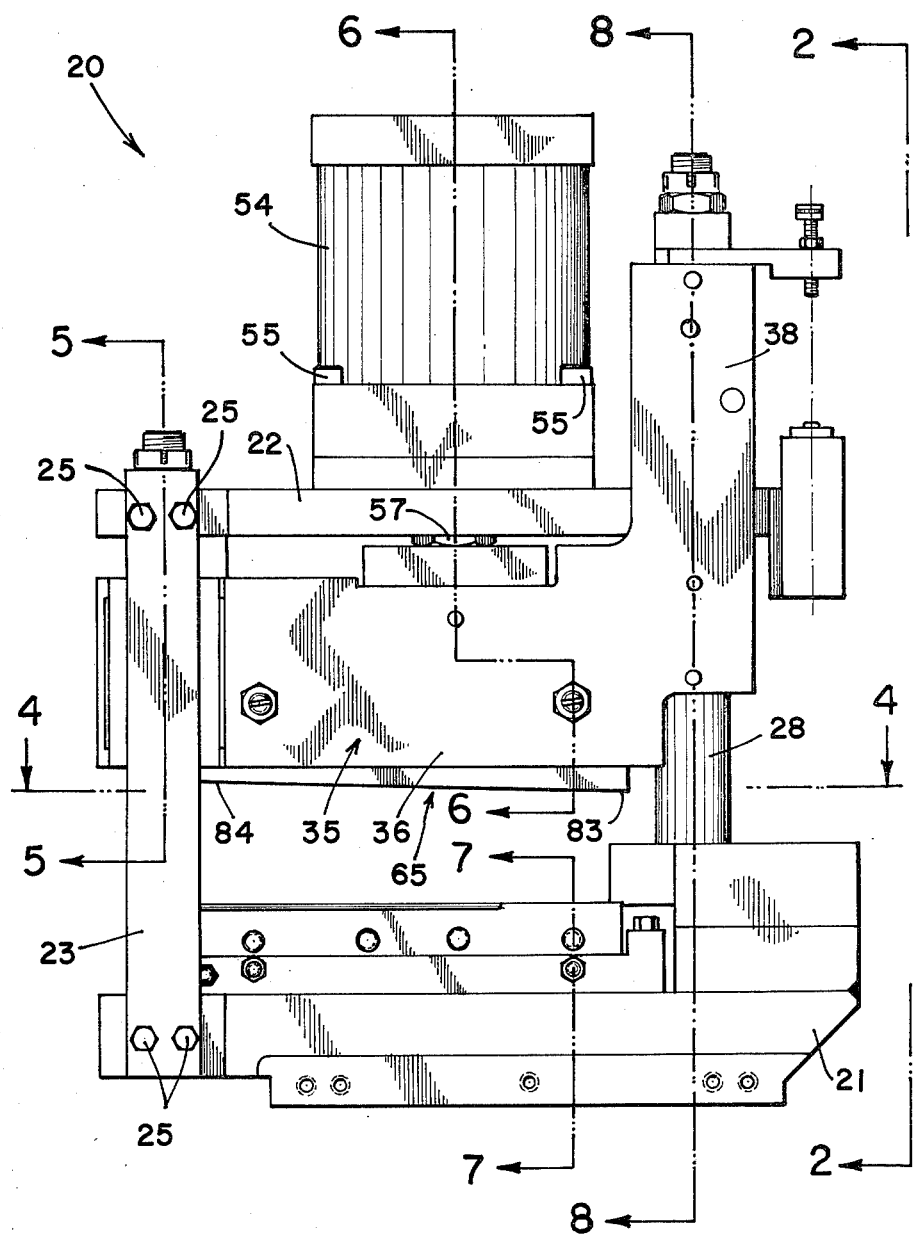
FIG. 1 is a frontal elevation of a guillotine assembly embodying the concepts of the present invention.

Vertical movement of the beam 35 along the pillars 28 and 29 is controlled by a cylinder 54 secured to the mounting plate 22 as by machine screws 55. A double-acting piston, not shown, within the cylinder 54 reciprocates the plunger 56 (FIG. 6) threadably received within the bore 58 of the connecting block 59 secured to the span portion 36 of beam 35. A lock nut 57 anchors the plunger 56 within the connecting block 59. As best seen in FIG. 1, the plunger 56 is preferably located laterally closer to the stabilizing portion 38 of the beam 35 as compared to the midsection of the span portion 36. This eccentricity enhances the operation of the guillotine assembly 20 as will become more apparent in conjunction with the explanation of the cutting blades and their relative disposition.

A safety plunger 60 is operated by a double-acting cylinder 61 and coacts with a bore 62 in the span portion 36 of beam 35 to effect a safety blocking mechanism. As is described in U.S. Pat. No. 4,087,308 a locking mechanism will preclude inadvertent descent of the beam 35 when the beam is located in its uppermost position.

Figure 6:
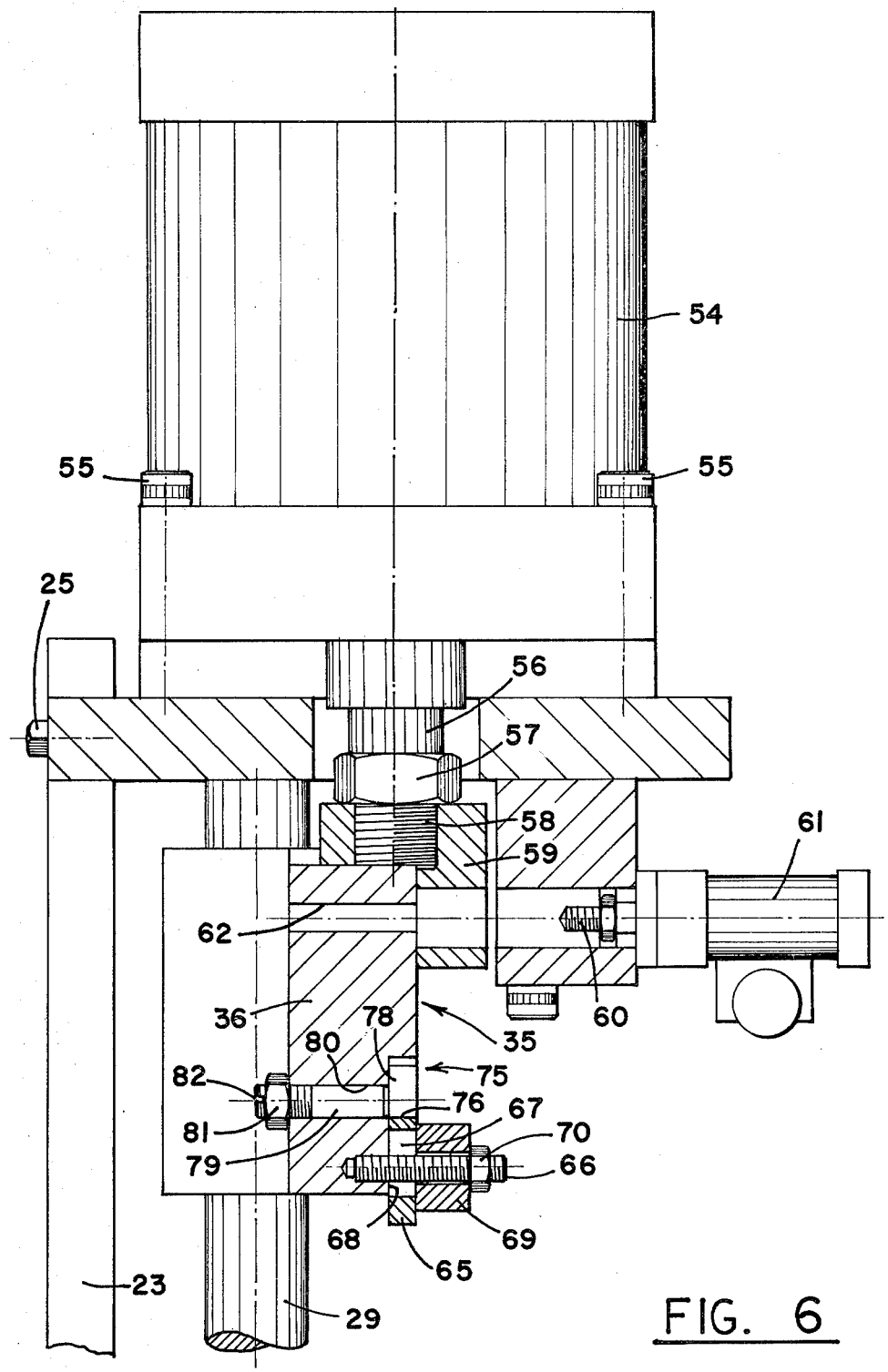
FIG. 6 is an enlarged vertical section taken substantially along line 6—6 of FIG. 1 and depicting the interrelationship of the upper cutting blade, the drive cylinder and the stop lock mechanism with respect to the beam.

An upper blade 65 is carried on the span portion 36 of beam 35. Referring particularly to FIG. 6, a plurality of mounting studs 66 are secured within and extend perpendicularly outwardly from a vertically oriented mounting face 68 provided on the span portion 36 of beam 35. The blade 65 is provided with a plurality of vertical slots 67 through which the mounting studs 66 can extend to allow a keeper bar 69 to clamp the blade firmly into position against the mounting face 68 in response to tightening of the nuts 70 on the studs 66.

A pair of blade cam assemblies 75 engage the uppermost, or follower, edge 76 of the blade 65 in longitudinally spaced relation therealong. Each cam assembly 75 may conveniently comprise a cylindrical cam block 78 that is affixed eccentrically on a cam post 79. The cam post 79 is rotatably received through a close fitting bore 80 oriented transversely with respect to the span portion 36 of beam 35. The end portion of the cam post 79 opposite the cam block 78 is threaded to receive a locking nut 81, and that same end may be slotted, as at 82, to facilitate selective rotation of the cam assembly 75 when the locking nut 81 is loosened.

To illustrate the operation of cam assembly 75, one can preposition them such that the minor lobe of each cam block 78 is directed downwardly. With the cam blocks so positioned the blade 65 is mounted with the uppermost, or follower, edge 66 thereof engaging both cam blocks. The mounting nuts 70 are then tightened sufficiently to retain the blade 65 against gravity but yet to allow the blade to be moved in response to rotative movement of the cam blocks 78. By selectively rotating one or both of the cam posts 79, the progressive throw between the minor and major lobes on the cam blocks 78 can be utilized to effect the desired disposition of the blade 65 with respect not only to the span portion 36 of the beam 35 but also with respect to a horizontal frame of reference. As depicted in FIG. 1, it is generally preferred that the heel portion 83 of the blade 65 be located at a lower level than the toe portion 84 in order to facilitate the cutting action hereinafter more fully described.

Turning now to the mechanism by which the lower, or anvil, blade 85 is mounted, a carrier 86 is secured to the basal platform 21 by a plurality of mounting cap screws 88 and 89 (FIG. 4) which extend through oversized apertures 90 and 91 in the respective mounting bosses 92 and 93 at each end of the carrier 86 and are received in threaded bores in the basal platform 21. Although not depicted, one should appreciate that the carrier may be provided with vacuum passages to maintain the severed article thereagainst subsequently to the cutting action of the guillotine assembly and while the cutting blades are separating.

Figure 7:
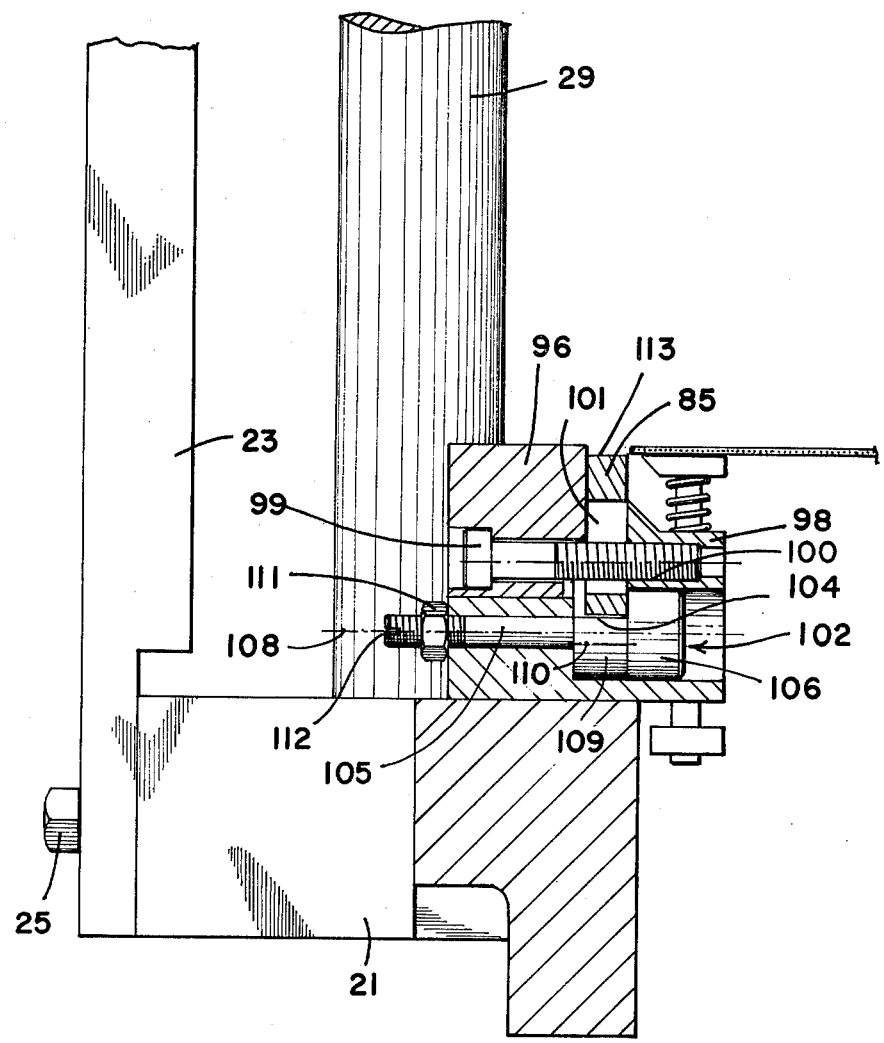
FIG. 7 is an enlarged vertical section taken substantially along line 7—7 of FIG. 1 and depicting the interrelationship of the anvil cutting blade and associated components to the basal platform.
Figure 10:
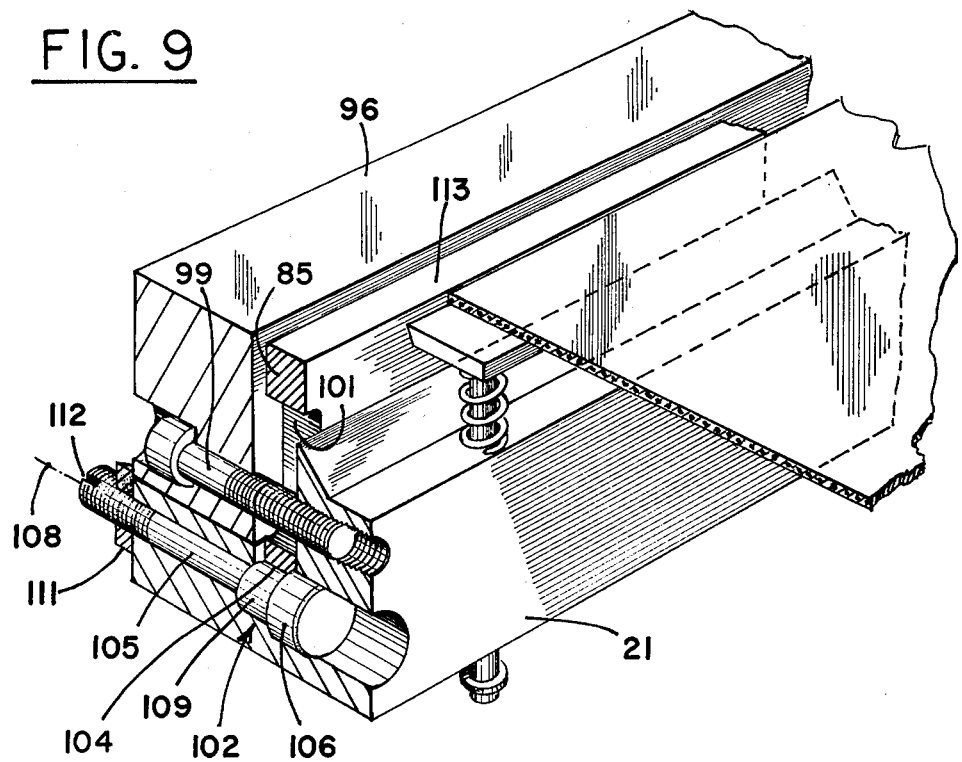
FIG. 10 is a perspective view of the anvil cutting blade mounting arrangement depicted schematically in FIG. 9.

As best seen in FIGS. 7 and 10 a keeper bar 96 is secured to the vertical leg 98 of the carrier 86 as by a plurality of machine screws 99, each of which are received in threaded bores 100 in the vertical leg 98 of the carrier 86. The anvil blade 85 is secured between the vertical leg 98 and the keeper bar 96. Vertically oriented clearance slots 101 are provided in the anvil blade 85 in order to accommodate penetration of the machine screws 99 therethrough.

Figure 9:
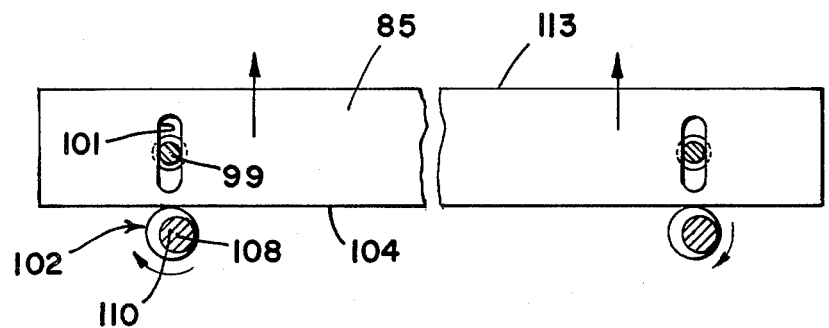
FIG. 9 is a schematic representation depicting the cam arrangement by which the vertical disposition of the anvil cutting blade is adjusted.

A pair of blade cam assemblies 102 are spaced longitudinally with respect to the anvil blade 85 and each engage the lowermost, or follower, edge 104 on the anvil blade 85 selectively to determine the vertical position of the anvil blade. As is perhaps best seen in FIGS. 9 and 10, the blade cam assembly 102, which is representative of both blade cam assemblies, has a shaft portion 105 and an enlarged head portion 106 aligned on the same axis 108. A cam block 109 is interposed between the shaft portion 105 and the enlarged head portion 106. The cam block 109 may also be of cylindrical section with the axis 110 thereof displaced laterally of axis 108. A lock nut 111 is threadably received on the shaft portion 105. Nut 111 can be tightened to secure that blade cam on which it is carried in the desired position. As shown in FIG. 10, the threaded end of the shaft portion 105 on blade cam assembly 102 may be slotted, as at 112, to facilitate rotation of the blade cam assembly. One could, of course, just as easily slot the head portion 106 were that deemed to be advantageous.

Blade cam assemblies 102 are employed to adjust the height of the anvil blade 85, as may be particularly required after the blade has been sharpened. Such adjustment is accomplished by loosening the machine screws 99 so that the anvil blade will move in response to rotation of the blade cam assemblies 102. The nuts 111 on the respective cam assemblies are also loosened, and the blade cam assemblies are rotated against the follower edge 104 of the anvil blade 85 until the cutting edge 113 thereof is oriented in the desired vertical position. Nut 111 on each blade cam assembly 102 is then tightened to lock the appropriate position of the blade cam assemblies 102, and the screws 99 are tightened rigidly to lock the anvil blade 85 to the carrier 86.

Once the vertical disposition of the anvil blade 85 is adjusted and secured, the lateral disposition of the anvil blade 85 with respect to the upper, or moving, blade 65 is adjusted.

The first step is to adjust the horizontal angular disposition of the anvil blade 85 with respect to the moving blade, and this may well be accomplished by adjusting the angular disposition of the carrier 86 with respect to the basal platform 21.

As best seen in FIG. 11, a passive control plug 115 cooperatively interacts between the carrier 86 and the basal platform in proximity to the heel portion 116 of the anvil blade 85. The passive control plug 115 comprises a cylindrical portion 118 that is rotatably received within a corresponding bore 119 in the carrier 86. A slide gib 120 of generally rectangular cross section extends axially outwardly from the cylindrical portion 118 and is slidably received within a conforming guide slot 121 in the basal platform 21.

An active control plug 125 cooperatively interacts between the carrier 86 and the basal platform 21 in proximity to the toe portion 126 of the anvil blade 85. The active control plug 125 also comprises a cylindrical portion 128 that is rotatably received within a corresponding bore 129 in the carrier 86. A cylindrical pin 130 extends outwardly of the cylindrical portion 128. Pin 130 is of smaller diameter than the cylindrical portion 128, and the axis 131 of pin 130, while oriented parallel to the axis 132 of the cylindrical portion 128, is displaced laterally with respect thereto. The pin 130 is also received in a conforming slot 133 in the basal platform 121.

Slots 121 and 133 are both designated as being conforming slots. Specifically, this means that the width of slot 121 conforms to the width of the slide gib 120, although the horizontal length of the slot 121 is considerably in excess of the corresponding dimension of the slide gib 120. Similarly, the width of slot 133 conforms to the diameter of the pin 130 although the horizontal length of slot 133 is considerably in excess of the diameter of pin 130.

At least the active control plug 125 is accessible through a bore 134 in the keeper bar 96. The upwardly directed surface of the cylindrical portion 128 is slotted, as at 135, to provide means by which the active control plug 125 may be selectively rotated. Rotation of the active control plug 125, when the mounting screws 88 and 89 are sufficiently loosened, causes the entire carrier 86 to swing about the cylindrical portion 118 of the passive control plug 115. As such, the angularity of the anvil blade 85 with respect to the upper blade 65 can be adjustably predetermined. This allows for progressive interference between the upper and anvil blades 65 and 85, respectively, from the head toward the toe of each.

It will be recalled that bearing block 45 is floatingly interconnected to the beam 35. The resiliency afforded this floating connection by virtue of the compression washer 51 permits a limited progressive lateral movement of the beam with respect to the pillar 29 or, to express that relative movement by reference to the blades, the upper, or moving blade 65 can accommodate to the progressive interference between it and the anvil blade 85.

In addition to the angularly progressive interference between the blades 65 and 85 predetermined by rotative adjustment of the active control plug 125, means are provided laterally to shift the anvil blade 85 not only independently of its angular orientation but also in such a way as to maintain its angular orientation. It is for this reason that the horizontal length of each slot 121 and 133 exceeds the corresponding dimension of the element received therein. In addition, the two slots are disposed with their horizontal axes 136 and 138, respectively, parallel and oriented obliquely with respect to the longitudinal axis 139 of the carrier 86.

Figure 4:
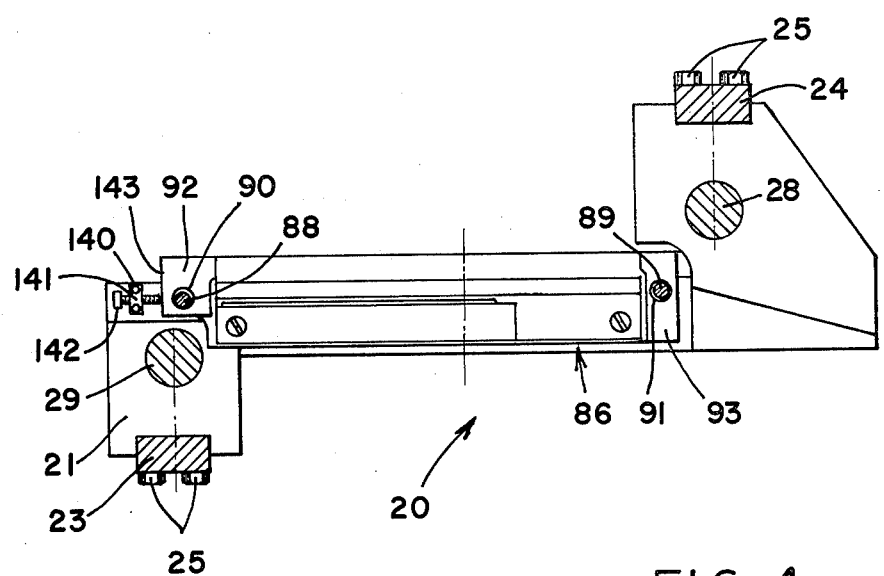
FIG. 4 is a horizontal section taken substantially along line 4—4 of FIG. 1 to show the basal platform and anvil knife assemblies secured thereto in top plan.

With particular reference to FIG. 4 it will be noted that an adjusting pedestal 140 is rigidly secured (as by screws 141) to, and extends upwardly from, the basal platform 21. An adjusting screw 142 is threadably received through the pedestal 140 and engages the opposing end wall 143 of the carrier 86. As such, when the mounting screws 88 and 89 are sufficiently loose, rotation of the adjusting screw 142 against the carrier 86 displaces the carrier 86 not only longitudinally but also laterally by virtue of the movement of the gib and pin 120 and 130, respectively, within their respective slots 121 and 133. The oversized bores 90 and 91 within which the mounting screws 88 and 89 are received permit the carrier so to move. This adjustment controls the degree of initial interference between the heel portions of the upper and anvil blades 65 and 85. Typically, several thousandths of an inch (0.0025 mm) initial interference will be desired between the heel portions of the upper and anvil blades, and particularly when the material to be cut would tend to spring the blades apart during the cut. Strips of elastomeric material longitudinally reinforced with steel strands, when cut transversely the direction of the reinforcing strands, tends particularly to spring the blades, and the use of both initial and progressive interference has been found to obviate this result. Once the lower blade has been moved to achieve the desired amount of initial interference, the machine screws 88 and 89 may be retightened to secure the position of the carrier 85 rigidly with respect to the basal platform 21.

It has also been found that the force required to initiate the cut, and at the same time to overcome the initial interference, is larger than required throughout the remainder of the cut. It is for this reason that the driving connection between the plunger 56 and beam 35 is applied in closer proximity to the heel portion of the upper blade than to the toe portion thereof. As an added benefit, the application of the driving power in closer proximity to the stabilizing leg 38 of the beam 35 reduces the force couple applied to the pillar 28 by the bearing blocks 39 and 40.

Once the cut has been initiated and the initial interference overcome, the progressively increasing interference between the upper and anvil blades assures continued, efficient cutting shear with the floating mount between the block 45 and the beam 35 accommodating the progressive interference—the latter often being in the range of six to eight thousandths of an inch (0.015 to 0.020 mm) along approximately a twelve inch (30.48 mm) blade. When a progressive interference of this magnitude is employed, the floating mount of block 45 is generally set to permit up to ten thousandths of an inch (0.025 mm) relative movement between the beam 35 and the block 45. This has been found sufficient to accommodate the interference and yet achieve the desired cut characteristics—and particularly so when the relative vertical inclination of the blades is such that the cutting action occurs progressively along the blade from the heel to the toe thereof. It will be recalled that this relative vertical inclination may be achieved by adjustment of the blade cam assemblies 75 to orient the upper blade 65 such that the cutting edge thereof will be vertically inclined with respect to the cutting edge of the anvil blade 85.

It should now be apparent that a guillotine assembly embodying the concept of the present invention permits the relative disposition of the opposed cutting blades to be accurately and adjustably preselected to effect a clean severing of the material to be cut thereby and otherwise accomplishes the objects of the invention.

We claim:

1. A guillotine assembly comprising: a basal platform; an anvil blade; means to secure said anvil blade to said basal platform; at least a pair of laterally spaced pillars having parallel axes and being secured to and extending upwardly from said basal platform; at least one bearing means slidably received on each said pillar; a beam suspended between said bearing means; an upper blade carried on said beam; the bearing means slidably received on one said pillar being rigidly affixed to said beam and being also rotatably received on said pillar; the bearing means slidably received on the other said pillar being floatingly supported from said beam whereby to accommodate interference between said upper and anvil blades by permitting limited progressive lateral movement between the beam and said other pillar.

2. A quillotine assembly, as set forth in claim 1, in which means are provided resiliently to resist movement between the bearing floatingly mounted on said beam and said beam.

3. A guillotine assembly, as set forth in claim 2, in which a stud is secured to the bearing means floatingly mounted on said beam; said stud extending through said beam; anchor means mounted on said stud to retain said stud with respect to said beam; and, resilient means interposed between said anchor means and said beam to permit the said limited progressive lateral movement between the beam and the pillar on which said bearing means is floatingly mounted.

4. A guillotine assembly, as set forth in claim 3, in which means are provided to permit relative longitudinal movement between the bearing means floatingly mounted on said means and said beam.

5. A guillotine assembly, as set forth in claim 4, in which a recess is provided in said beam and a locating pad is presented from said bearing means floatingly mounted on said beam; said locating pad being received within said recess; the horizontal dimension of said recess being greater than the corresponding dimension of said locating pad.

6. A guillotine assembly, as set forth in claim 5, in which the vertical dimensions of said recess and said locating pad are substantially equal.

7. A guillotine assembly, as set forth in claim 6, in which the anvil blade is secured to a carrier; said anvil blade has a heel and toe portion; a passive plug interconnects the carrier to said basal platform in proximity to the heel portion of said anvil blade; said carrier being rotatable with respect to said passive plug; a control plug interconnects the carrier to the basal platform in proximity to the toe portion of said anvil blade; selective rotation of said control plug effects rotation of said carrier with respect to said basal platform and about said passive plug.

8. A guillotine assembly, as set forth in claim 7, in which said passive plug comprises: a cylindrical body portion having an axis and being rotatably received within a corresponding bore in said carrier; a gib extending axially outwardly of said cylindrical body portion; a recess in said basal platform; said gib nonrotatably received in said recess.

9. A guillotine assembly, as set forth in claim 8, in which said first and second recesses comprise slots; said slots each having a horizontal axis; and, the horizontal axes of said slots being substantially parallel.

10. A guillotine assembly, as set forth in claim 9, in which adjusting means are provided to move said carrier along the axes of said slots.

* * * * *